G. ESTERLY.
Combined Harvester and Rake.
No. 23,666. Patented April 19, 1859.
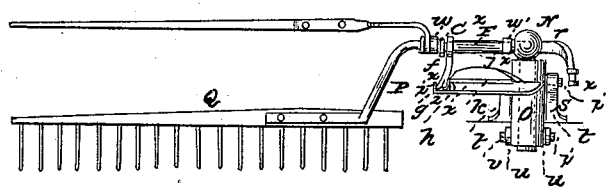
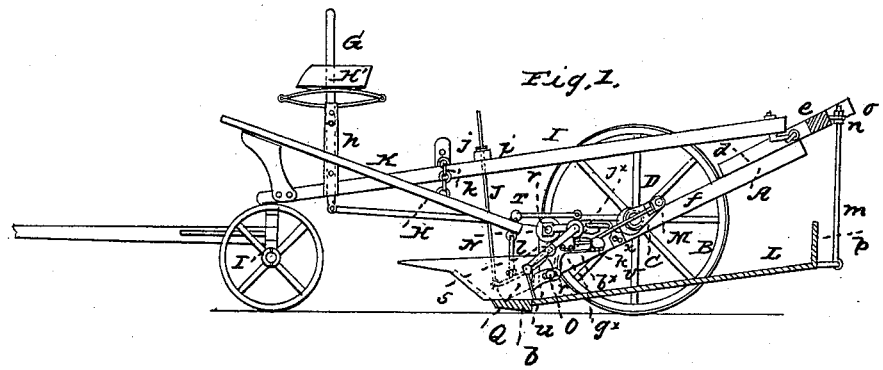
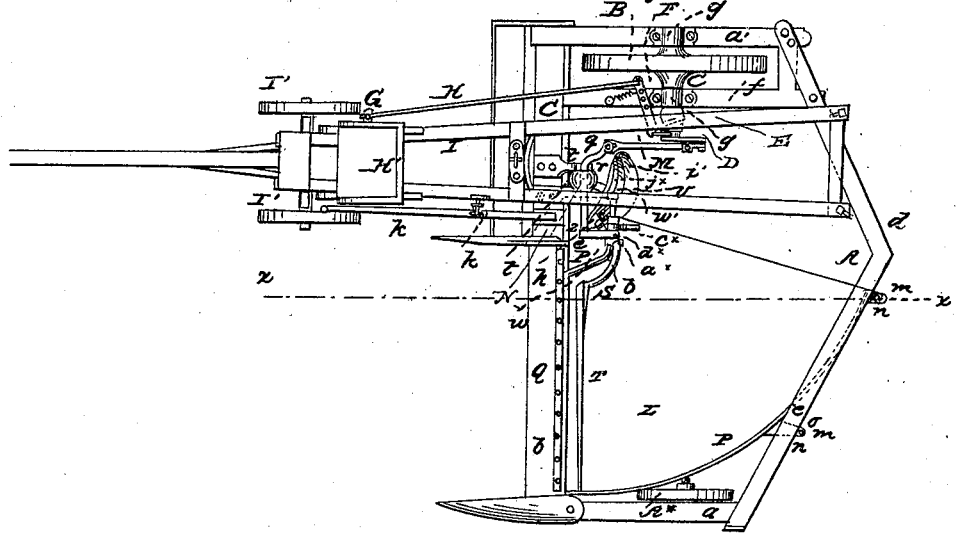
Inventor:
Geo. Esterly

UNITED STATES PATENT OFFICE.

GEORGE ESTERLY, OF WHITEWATER, WISCONSIN.

IMPROVEMENT IN HARVESTING-MACHINES.

Specification forming part of Letters Patent No. 23,666, dated April 19, 1859.

*To all whom it may concern:*

Be it known that I, GEORGE ESTERLY, of Whitewater, in the county of Walworth and State of Wisconsin, have invented a new and Improved Combined Automatic Rake and Harvester; and I do hereby declare that the following is a full, clear, and exact description of the same, reference being had to the annexed drawings, making a part of this specification, in which—

Figure 1 is a side sectional view of my invention, taken in the line $x\,x$, Fig. 2; Fig. 2, a plan or top view of the same; Fig. 3, a detached back view of the rake, guard-finger, and a greater portion of the operating mechanism.

Similar letters of reference indicate corresponding parts in the several figures.

This invention consists in a novel way of operating and applying a raking attachment to a grain and grass harvester, and in a peculiar construction of the latter, as hereinafter fully shown and described, whereby the two devices are well adapted to each other and made to operate conjointly in a perfect manner to perform the desired work.

To enable those skilled in the art to fully understand and construct my invention, I will proceed to describe it.

A represents the frame of the machine, constructed of two parallel bars, $a\,a'$, connected at their front ends to traverse-bars $b\,c$, one of which, $b$, is the finger-bar, the back ends of the bars $a\,a'$ being connected by oblique bars $d\,e$. A supplemental bar, $f$, is attached to the frame A, parallel with the bar $a'$ and quite near to it. The form of the frame is clearly shown in Fig. 2.

Between the bars $a'\,f$ the master or driving wheel B is placed. C is its axle, the bearings $g$ of which are on the bars $a'\,f$. On the inner end of the axle C a crank, D, is placed loosely, said crank being connected with the axle, when desired, so as to turn with it, by means of a clutch, E, which is actuated by means of levers F G and a rod, H, as shown in Figs. 1 and 2, the lever G extending upward by the side of the driver's seat H′, which is attached to uprights $h\,h$ on a taper frame, I, the front end of said frame being connected by a king-bolt to the axle of a pair of traction-wheels, I, which support the front end of the machine, and to which axle the draft-pole is attached. The back part of the frame I is connected by hinge-joints to the back oblique bar, $d$, of the frame A.

To the front traverse-bar, $c$, of the frame A an upright perforated bar, J, is attached by joint hinges, said bar passing through a mortise in a traverse-bar, $i$, of the frame I, and determining by means of a pin, $j$, which is fitted in either of its perforations the height of the front part of the frame A, and consequently the cutting device, from the surface of the ground. By adjusting therefore the pin $j$ properly in the bar J the crop may be cut the desired height from the ground.

To the inner side of the frame I a foot-lever, K, is attached by a link, $k$. The end of this lever is connected by a link, $l$, with the bar $c$ of the frame A, and the driver may at any time, by depressing the outer end of lever K, temporarily raise the front part of the frame A, to allow the sickle to pass over any obstruction that may lie in its path. (See more particularly Fig. 1.)

L is the platform of the machine. This platform is of quadrant shape, one edge or end being attached to the back part of the finger-bar $b$ by hinge-joints and the opposite end sustained by rods $m\,m$, the upper ends of which have screw-threads formed on them and pass through eyes $n$, attached to the oblique bar, and have nuts $o$ fitted on them. By this method of attaching the platform to the machine its back end, it will be seen, may be adjusted higher or lower, as desired, by turning nuts $o$. (See more particularly Fig. 1.) The curved edge of the platform has a vertical ledge or fender, $p$, attached.

To the crank D one end of the connecting-rod M is attached, and the opposite end of said rod is connected by a universal joint, $q$, to an arm, $r$, which passes through and is secured in the upper end of an arbor, N, which is fitted loosely in a socket, O. The socket O is suspended by journals or trunnions $s$ between the upper ends of two supports, $t\,t$, which are attached to the bar $c$. (See more particularly Fig. 3.) The lower end of the socket O works or is fitted between slotted bars $u\,u$, through which set-screws $v\,v$ pass, and by which the socket may be secured in a vertical or in a more or less inclined position, as circumstances may require. This adjustment of the socket will be understood by referring to Fig. 1.

The end of the arm $r$ nearest the wheel B is curved downward below the other portion, and to a point in the same horizontal plane as the journals or trunnions $s$ of the socket O. (See Fig. 3.) The straight portion of the arms $r$ has two rods, $w$ $w'$, projecting from it at right angles, one of which, $w'$, may be cast with the arm or permanently attached to it in any proper way. The rods $w$ $w'$ form the bearings or supports for a bent shaft, P, the exact form of which is shown clearly in Fig. 3. This shaft is allowed to turn freely in its bearings, and to its outer end, which is its lower end, a rake, Q, is attached, the rake being constructed in the usual way, as also shown clearly in Fig. 3. The rake Q is of sufficient length to extend to the ledge or fender $p$ of the platform, or as near as may be without being in contact with it. (See Fig. 2.)

On the bearing $w$ of the shaft P a curved rod or bar, S, is attached by a set-screw $a^x$, said set-screw passing through a collar, $b^x$, which is fitted on the bearing, and to which the rod or bar S is secured. (See more particularly Fig. 2.)

To the outer end of the rod or bar S a finger, T, is attached, which finger is about equal in length to the rake, and is parallel with and adjusted above it at a greater or less height by adjusting the rod or bar S on the bearing $w$.

On the shaft P, between the two bearings $w$ $w'$, a projecting spur or rod, $c^x$, is attached, secured thereto by a collar, $d^x$, and set-screws $e^x$. A pendent rod, $f^x$, is also attached in the same manner to the shaft P, and adjoining the spur or rod $c^x$. The lower end of the rod $f^x$ is divaricated, and each branch or fork has a friction-roller attached, as represented by $g^x$ $h^x$.

To the socket O a projecting plate, U, of segment form is attached. This plate has its ends $i^x$ $i^x$ curved upward, as shown clearly in Fig. 3, and to the plate U an elevated curved flange, $j^x$, is attached, and just below said flange $j^x$ there is a lateral projecting rib, $k^x$.

The operation is as follows: The manner of adjusting the height of the sickle by the pin $j$ has been already described, as also the elevating of the sickle by the driver in order to allow it to pass over obstructions. As the machine is drawn along the crank D, when in gear or connection with the axle C of wheel B, will, through the means of the connecting-rod M, oscillate or vibrate the arm $r$, and the rake Q will traverse over the platform L. As the rake moves forward it is elevated above the platform in consequence of the roller $h^x$ passing over the elevated flange $j^x$, the rake falling by its own gravity as the roller $h^x$ drops off the front end of the flange $j^x$ in front of the cut grain. As the rake moves backward and carries off the cut grain, the roller $g^x$ moves on the plate U, the roller $h^x$ passing under the rib $k^x$ and preventing the casual raising of the rake. When the rake reaches the back end of the platform it is raised in consequence of the rollers passing up the inclined end $i^x$, and the spur or rod $c^x$ is at that time actuated by the connecting-rod M, so that the roller $h^x$ will be turned on or canted upward on the elevated flange $j^x$. The object of this arrangement is to carry the weight of the rake on the roller, preventing the rake-teeth from scraping the platform, thereby wearing it out, also to prevent friction and thereby avoid the unnecessary application of power to operate the device. The guard-finger T prevents the grain from falling on the rake Q. The arbor N is placed at a point which is the center of a circle of which the quadrant-platform L is a part. Said arbor therefore is in front of the driving-wheel B, and near the line of the sickle, and will also be in line with the rake Q when the latter has dropped into the grain at the front end of the platform to sweep the cut grain off from it. By this arrangement the rake performs the movement of a quarter-circle without coming in contact with the grain-wheel $A^x$—a contingency which would occur in all other modes of arrangement that have come under my observation, unless the grain-wheel be placed at the outer side of the cut of the sickle to allow room for the rake, and in this case it could not be allowed to extend to the extreme end of the sickle without crowding the grain-wheel too far into the standing grain. This is a serious objection to all automatic rakes which sweep the grain from the platform on a quarter-circle, when the fulcrum of the rake is near the center of the driving-wheel. There is not only the difficulty of working the rake in the outside corner of the machine and coming in contact with the grain-wheel, but the platform must be lengthened in proportion as the fulcrum is moved back from the sickle-beam, which makes the machine more cumbersome and much more difficult to manage, and when the grain-wheel is thus thrown beyond the cut of the sickle it cannot be used in mowing grass, as it would roll it down beyond where it is cut. Consequently a separate attachment requires to be added at considerable additional cost.

The rake-shaft P being placed back of the fulcrum—that is, the arbor N—and resting in its bearings $w$ $w'$ allows room to make sufficient bend in the shaft to allow it to rise as high as required to clear the bundle on the platform, the rake-shaft being connected and moved by the arbor N and arm $r$, describes the circle (so far as the rake is concerned) that it would had the rake been directly connected with the arbor N and arm $r$, thus having the advantage of the fulcrum or arbor N in line with the sickle-bar and the rake-shaft P sufficiently far back to admit of the required elevation when traveling forward.

The driver can regulate at will the size of the bundles by operating the clutch E, as the operation of the rake Q is governed thereby. By having the universal joint $q$ in the same horizontal plane with the journals or trunnions $s$ of the socket O the latter may be adjusted in a more or less inclined position to regulate the height of the rake without affecting the connecting-rod M, as regards length—that is to say, one connecting-rod only will be required in all cases. If the aforesaid parts were differently disposed, connecting-rods of varying lengths would be required.

The socket O is adjusted to regulate the movement of the rake, so that it may work in a position to suit the height the grain is being cut, and as the plate U moves with the socket O it follows, as a matter of course, that the rod $c^x$ requires to be adjusted to suit the position of the plate U. It will also be seen that the platform L must be adjusted by turning the nuts $o$ to suit the position of the other parts.

The bars $d\ e$ are placed in oblique positions in order to allow room for the rake to pass or perform its necessary vibrations without extending the bars $a\ a'$ sufficiently to accomplish the object without said oblique bars. The latter mode of construction would not only render the machine more cumbersome, but also weaker, and would add much to its weight behind, thereby rendering necessary, in order to balance the machine, an additional weight in front—thus the great advantage in the peculiar construction or the frame with the angle to make room for the rake without the additional weight that must of necessity be added by extending the frame farther back.

Having thus described my invention, what I claim as new, and desire to secure by Letters Patent, is—

1. The adjusting of the rake Q by means of the socket O, suspended by journals or trunnions $s\ s$, and secured in the desired position by set-screws $v$ and bars $u\ u$, or their equivalents, in combination with the adjustable platform L, whereby the rake and platform may be adjusted to suit the height the grain is being cut.

2. The segment-plate U, with the curved flange $j^x$, for the purpose of carrying the rake backward, as described.

3. The use of the pendent rod or bar $f^x$, provided with the rollers $g^x\ h^x$, in combination with the flange $j^x$, for the purpose specified.

4. I do not claim the guard-finger T, but I claim attaching the guard-finger T to the bearing W in the manner described, whereby it may be adjusted for the purpose specified.

GEO. ESTERLY.

Witnesses:
   F. L. KISER,
   GEO. W. ESTERLY.